United States Patent [19]

Henderson

[11] Patent Number: 5,777,656
[45] Date of Patent: Jul. 7, 1998

US005777656A

[54] TONE REPRODUCTION MAINTENANCE SYSTEM FOR AN ELECTROSTATOGRAPHIC PRINTING MACHINE

[75] Inventor: Thomas A. Henderson, Rochester, N.Y.

[73] Assignee: Xerox Corporation, Stamford, Conn.

[21] Appl. No.: 475,706

[22] Filed: Jun. 7, 1995

[51] Int. Cl.$^6$ .................. B41J 2/47; G01D 15/14
[52] U.S. Cl. ................................................ 347/251
[58] Field of Search ..................... 347/15, 19, 251, 347/252, 254, 240, 131; 399/181, 39, 49; 358/298

[56] References Cited

U.S. PATENT DOCUMENTS

| | | | |
|---|---|---|---|
| 4,571,069 | 2/1986 | Kimura et al. | 355/14 |
| 4,680,646 | 7/1987 | Ikeda et al. | 358/298 |
| 4,751,377 | 6/1988 | Ishizaka et al. | 250/205 |
| 4,816,863 | 3/1989 | Lee | 355/14 |
| 5,073,028 | 12/1991 | Bowden et al. | 356/402 |
| 5,083,161 | 1/1992 | Borton et al. | 355/208 |
| 5,107,332 | 4/1992 | Chan | 358/80 |
| 5,162,874 | 11/1992 | Butler | 356/446 |
| 5,266,997 | 11/1993 | Nakane et al. | 355/208 |
| 5,343,282 | 8/1994 | Kazaki et al. | 355/326 |
| 5,345,315 | 9/1994 | Shalit | 358/406 |
| 5,351,107 | 9/1994 | Nakane et al. | 355/208 |
| 5,434,604 | 7/1995 | Cleary et al. | 347/19 |
| 5,493,321 | 2/1996 | Zwaldo | 347/131 |
| 5,508,826 | 4/1996 | Lloyd et al. | 358/501 |
| 5,519,419 | 5/1996 | Stephany et al. | 347/19 |

*Primary Examiner*—Safet Metjahic
*Assistant Examiner*—Christopher E. Mahoney
*Attorney, Agent, or Firm*—Lloyd F. Bean, II

[57] ABSTRACT

An apparatus and method for maintaining tone reproduction for printing of a final halftoned image in a printer, including scanner for generating a continuous tone image. A halftoner is provided for generating pixel data based on the continuous tone image, each pixel data having pixel position parameters and desired pixel darkness parameters. A developer unit is provided for marking representative halftone targets on an imageable surface with toner. A sensor is provided for sensing an amount of toner on each of the representative halftone targets. A tone control system is provided for generating a representative tone reproduction curve based on the amount of toner sensed on the representative halftone targets. A monitoring system is provided for producing a feedback signal by comparing the representative tone reproduction curve to a setup calibration tone curve, and wherein the halftoner being responsive to the monitor system, adjusts pixel data of each pixel of the final halftone image to compensate for deviation between representative tone reproduction curve and the setup calibration tone curve during printer operation to achieve the desired tonality of the final halftone image.

18 Claims, 12 Drawing Sheets

```
Real     SetCurve[256],PrinterTrc[256]
Integer  LookUpTable[256],NewLookUpTable[256]
Integer  i,j,k,NewPoint                              \ Data definitions LookUpTableCorrect
{
  NewLookUpTable[1] = LookUpTable[ 1 ]               \ Compute the new lookup table.
  j = 2                                              \ The endpoints are assumed equal.
  k = 1                                              \ j points to upper bound.
  for(i = 2 to 256)                                  \ k point to lower bound.
  { if(SetCurve[i] < = PrinterTrc[j])                \ Loop over all table entries.
      NewLookUpTable[i] =                            \ The two points that contain
        Interpolate(SetCurve[i],                     \ the SetCurve point are already found.
          PrinterTrc[j],PrinterTrc[k],               \ Call the interpolation.
          LookUpTable[j],LookUpTable[k])
    else
    begin                                            \ Search ahead for the upper bound.
      {
        j = j + 1
      until (SetCurve[i] < = PrinterTrc[j])
      }
      NewLookUpTable[i] =                            \ Call the interpolation.
        Interpolate(SetCurve[i],
          PrinterTrc[j],PrinterTrc[k],
          LookUpTable[j],LookUpTable[k])
      k = j                                          \ Reset lower bound.
    endif
  }
}

Interpolate(SetPoint,Plow,Phigh,Llow,Lhigh)
{
  NewPoint = Llow                                    \ Find the best new lookup table entry.
    + [(SetPoint – Plow) / (Phigh – Plow)            \ Use a linear interpolation.
    * (Phigh – Plow)
  return(NewPoint);                                  \ NewPoint is the new lookup table entry.
}
```

*FIG. 8*

TONE REPRODUCTION MAINTENANCE SYSTEM FOR AN ELECTROSTATOGRAPHIC PRINTING MACHINE

The present invention relates generally to an electrostatographic printing machine and, more particularly, concerns a process control system, preferably for use in a multi-color electrophotographic printing machine.

The quality or acceptability of a color print is a function of how the human eye and mind receives and perceives the colors of the original or source image and compares it to the colors of the print. The human eye has three color receptors that sense red light, green light, and blue light. These colors are known as the three primary colors of light. These colors can be reproduced by one of two methods, additive color mixing and subtractive color mixing, depending on the way the colored object emits or reflects light.

In the method of additive color mixing, light of the three additive primary colors, red, green, and blue is projected onto a white screen and mixed together to create various colors. A well known exemplary device that uses the additive color method is the color television. In the subtractive color method, colors are created from the three colors yellow, magenta and cyan, that are complementary to the three primary colors. The method involves progressively subtracting light from white light. Examples of subtractive color mixing are color photography and color printing.

Modern electronic printers are capable of producing quite complex and interesting page images. The pages may include text, graphics, and scanned or computer-generated images. The image of a page may be described as a collection of simple image components or primitives (characters, lines, bitmaps, colors). Complex pages can then be built by specifying a large number of the basic image primitives. This is done in software using a page description language such as PostScript. The job of the electronic printer's software is to receive, interpret and under each of the imaging primitives for the page. The drawing, or rasterization must be done on an internal, electronic model of the page. All image components must be collected and the final page image must be assembled before marking can begin. This electronic model of the page is often constructed in a data structure called an image buffer. The data contained is in the form of an array of color values called pixels. Each pixel corresponds to a spot which can be marked on the actual page and the pixel's value gives the color which should be used when marking. The pixels are organized to reflect the geometric relation of their corresponding spots. They are usually ordered such as to provide easy access in the raster pattern required for marking.

In generating color pictorial images, a large number of colors and moderate spatial resolution are generally required to achieve a high-quality image. Because the eye can detect approximately 100 intensity levels, i.e., for three color separations, seven bits per color separation per pixel, imaging systems should support at least this number of intensity levels. Generally, however, imaging systems support 256 different intensity levels. The 256 intensity levels supported by an imaging system performing three color separations for a full-color image correspond to eight bits per color separation, i.e., twenty-four bits per pixel. Accordingly, for high-quality renditions of real-life scenes, an imaging system supporting at least 100 intensity levels detectable by the eye requires less than 200 pixels per inch to achieve an image having a sufficient level of spatial resolution.

The present invention employs an electrostatographic printing machine which generally employs an initial step of charging a photoconductive member to a substantially uniform potential. The charged surface of the photoconductive member is thereafter exposed to a light image of an original document to selectively dissipate the charge thereon in selected areas irradiated by the light image. This procedure records an electrostatic latent image on the photoconductive member corresponding to the informational areas contained within the original document being reproduced. The latent image is then developed by bringing a developer material including toner particles adhering triboelectrically to carrier granules into contact with the latent image. The toner particles are attracted away from the carrier granules to the latent image, forming a toner image on the photoconductive member which is subsequently transferred to a copy sheet. The copy sheet having the toner image thereon is then advanced to a fusing station for permanently affixing the toner image to the copy sheet in image configuration.

The approach utilized for multicolor electrostatographic printing is substantially identical to the process described above. However, rather than forming a single latent image on the photoconductive surface in order to reproduce an original document, as in the case of black and white printing, multiple latent images corresponding to color separations are sequentially recorded on the photoconductive surface. Each single color electrostatic latent image is developed with toner of a color complimentary thereto and the process is repeated for differently colored images with the respective toner of complimentary color. Thereafter, each single color toner image can be transferred to the copy sheet in superimposed registration with the prior toner image, creating a multi-layered toner image on the copy sheet. Finally, this multi-layered toner image is permanently affixed to the copy sheet in substantially conventional manner to form a finished color copy.

With the increase in use and flexibility of printing machines, especially color printing machines which print with two or more different colored toners, it has become increasingly important to monitor the toner development process so that increased print quality, stability and control requirements can be met and maintained. For example, it is very important for each component color of a multi-color image to be stably formed at the correct toner density because any deviation from the correct toner density may be visible in the final composite image. Additionally, deviations from desired toner densities may also cause visible defects in mono-color images, particularly when such images are half-tone images.

It is known to monitor the developed mass per area (DMA) for a development process by using densitometers such as, for example, infra-red densitometers (IRDs) to measure the mass of a toner patch formed on the imaging member.

Another example of a process control which is monitored includes the developability. Developability is the rate at which development (toner mass/area) takes place. Developability is typically monitored (and thereby controlled) using densitometers (e.g., IRDs) and by measuring toner concentration (TC) in the developer housing. As described above, IRDs measure total developed mass (i.e., on the imaging member), which is a function of developability and electrostatics. Thus, the developability cannot be determined using IRDs alone because the electrostatics of the imaging member also affect the mass of toner deposited on the imaging member by a developer device. TC is measured by directly measuring the percentage of toner in the developer housing (which, as is well known, contains toner and carrier particles). However, the relationship between TC and developability is affected by other variables such as ambient temperature, humidity and the age of the toner. For example, a 3% TC results in different developabilities depending on the variables listed above. Thus, maintaining TC at a predetermined value does not ensure a desired developability.

To further complicate matters, as the photoreceptor ages, its electrical parameters change, for example, it undergoes conditions known as cycle-up and cycle-down. Cycle-up (residual rise) is a phenomenon in which residual potential and/or background potential keeps increasing as a function of cycles, which generally leads to increased and unacceptable background density in copies of documents. Cycle-down is a phenomenon in which the dark development potential (potential corresponding to unexposed regions of the photoreceptor) keeps decreasing as a result of dark decay as a function of cycles, which generally leads to reduced image densities in the copies of documents.

Accordingly, the monitoring and control of the toner development process can be difficult and complicated. It is desirable to provide new and useful means for monitoring the toner development process so that the toner development process can be appropriately controlled. Various approaches have been hereinbefore devised.

U.S. Pat. No. 5,083,161 to Borton et al. discloses an infrared densitometer which measures the reflectivity of a selected region on a moving photoconductive belt covered at least partially with marking particles. Collimated light rays are projected onto the selected region of the moving photoconductive member with or without marking particles thereon. The light rays reflected from the selected region of the moving photoconductive member are collected and directed onto a photodiode array. A photodiode array generates electrical signals proportional to the diffuse component of the total reflectivity of the selected region of the photoconductive member with and without marking particles thereon. Circuitry determines a control signal as a function of the difference in electrical signals.

U.S. Pat. No. 5,162,874 to Butler discloses an electrophotographic apparatus having a densitometer, which measures material density located on a substrate by detecting and analyzing only a single diffuse electromagnetic energy signal reflected off of the density of material located on the substrate. Specifically, the apparatus must first be compensated for environmental and individual machine differences using a high density of the material. Moreover, once compensated, the apparatus is calibrated to determine the relationship between diffuse signals and material density. This relationship is calculated by sampling a clean substrate and low densities of the material. Once the relationship is determined, densities of material can be calculated given a corresponding diffuse signal. The calibrated and compensated density calculations enable accurate monitoring and adjustment of the electrophotographic apparatus color toner development systems.

U.S. Pat. No. 4,816,863 to Lee discloses an exposure control system which permits accurate reproduction of optical density levels on a final image is characterized by a dynamically corrected look-up table. The look-up table is used to calculate each desired exposure intensity level for each image pixel on the basis of data obtained during the exposure and development of an immediately preceding image.

U.S. Pat. No. 5,343,282 to Kazaki et al. discloses a color balance adjusting apparatus used for a full color copier in which an original image is illuminated by a light source; the illuminated image is exposed onto a photoreceptor to form electrostatic latent images corresponding to first, second and third colors for creating a color image; and each of the formed electrostatic latent images is developed into a visualized toner image. The color balance adjusting apparatus includes an infrared sensor for detecting toner density of the toner image formed with a toner having any one color of the first, second and third colors. The apparatus further includes automatic adjustment means which determines a relation of light intensity to toner density detected for one color by varying light intensity of said light source, and which determines optimal light intensity for the other two colors as predetermined functions of obtained optimal light intensity. Using this apparatus, automatic adjustment of the color balance for each copy mode can be effected in a short time with lesser consumption of electricity and supplies.

U.S. Pat. No. 5,351,107 to Nakane et al. discloses a method which high and low density test patterns are formed from pattern generating unit as toner patterns on a photosensitive drum, and attached toner amounts corresponding to the test patterns are detected by toner density detecting unit under the control of a control circuit which calculates the differences between the attached toner amounts of the high and low density portions and respective target values, wherein, when the calculated differences do not fall within respective predetermined ranges, the exposure conditions of an optical system and the bias voltage of a developing unit, or the exposure amount of the optical system and the bias voltages of a charger and the developing unit, or the bias voltages of the charger and the developing unit and the light-emission period of the optical system are renewed.

U.S. Pat. No. 5,266,997 to Nakane et al. discloses a toner sensor that measures the amount of toner attached onto a photosensitive drum upon development by a developing unit. A controller compares the measured toner attaching amount with a predetermined reference value, and executes processing for changing at least one of image forming conditions, for example, the charging amount by a charger, the developing bias voltage of the developing unit, the exposure amount of an optical system, and the toner density of the developing unit, on the basis of the comparison result.

Pursuant to an aspect of the invention there is provided a method of maintaining tone reproduction in a printer, including the steps of generating a continuous tone image based on an original document; encoding the continuous tone image by dividing the continuous tone image into a plurality of pixels and generating pixel data for each pixel, the pixel data having a position of each pixel and a desired darkness of gray of the corresponding pixel; of marking representative halftone targets on an imageable surface with toner; sensing an amount of toner on each of the representative halftone targets; generating a representative tone reproduction curve base on the amount of toner sensed on the representative halftone targets; producing a feedback signal by comparing the representative tone reproduction curve to a setup calibration tone curve; adjusting pixel data of each pixel of the final halftone image to compensate for deviation between representative tone reproduction curve and the setup calibration tone curve during printer operation to achieve the desire tonality of the final halftone image.

Pursuant to another aspect of the invention there is provided an apparatus for maintaining tone reproduction for printing of a final halftoned image in a printer, including a source of continuous tone image data. A halftoner is provided for generating pixel data based on the continuous tone image, each pixel data having pixel position parameters and desired pixel darkness parameters. A developer unit is provided for marking representative halftone targets on an imageable surface with toner. A sensor is provided for sensing an amount of toner on each of the representative halftone targets. A tone control system is provided for generating a representative tone reproduction curve base on the amount of toner sensed on the representative halftone targets. A monitoring system is provided for producing a feedback signal by comparing the representative tone reproduction curve to a setup calibration tone curve, and wherein the halftoner being responsive to the monitor system, adjusts pixel data of each pixel of the final halftone image to compensate for deviation between representative tone reproduction curve and the setup calibration tone curve during printer operation to achieve the desired tonality of the final halftone image.

Other features of the present invention will become apparent as the following description proceeds and upon reference to the drawings, in which:

FIG. 8 illustrates the correct algorithm of the present invention;

Figure 11:
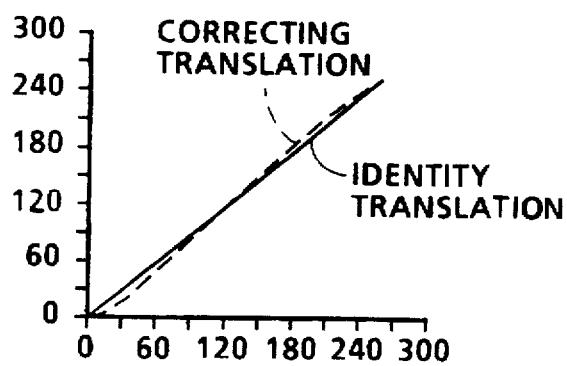
Figure 12:
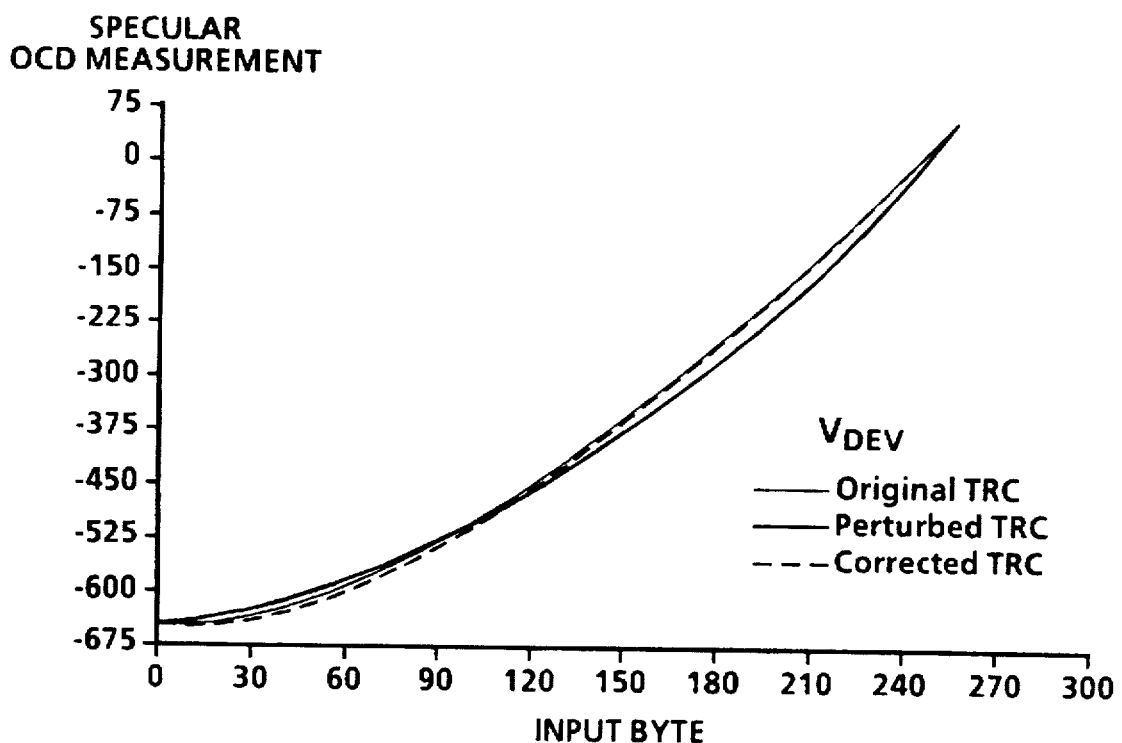
Figure 13:
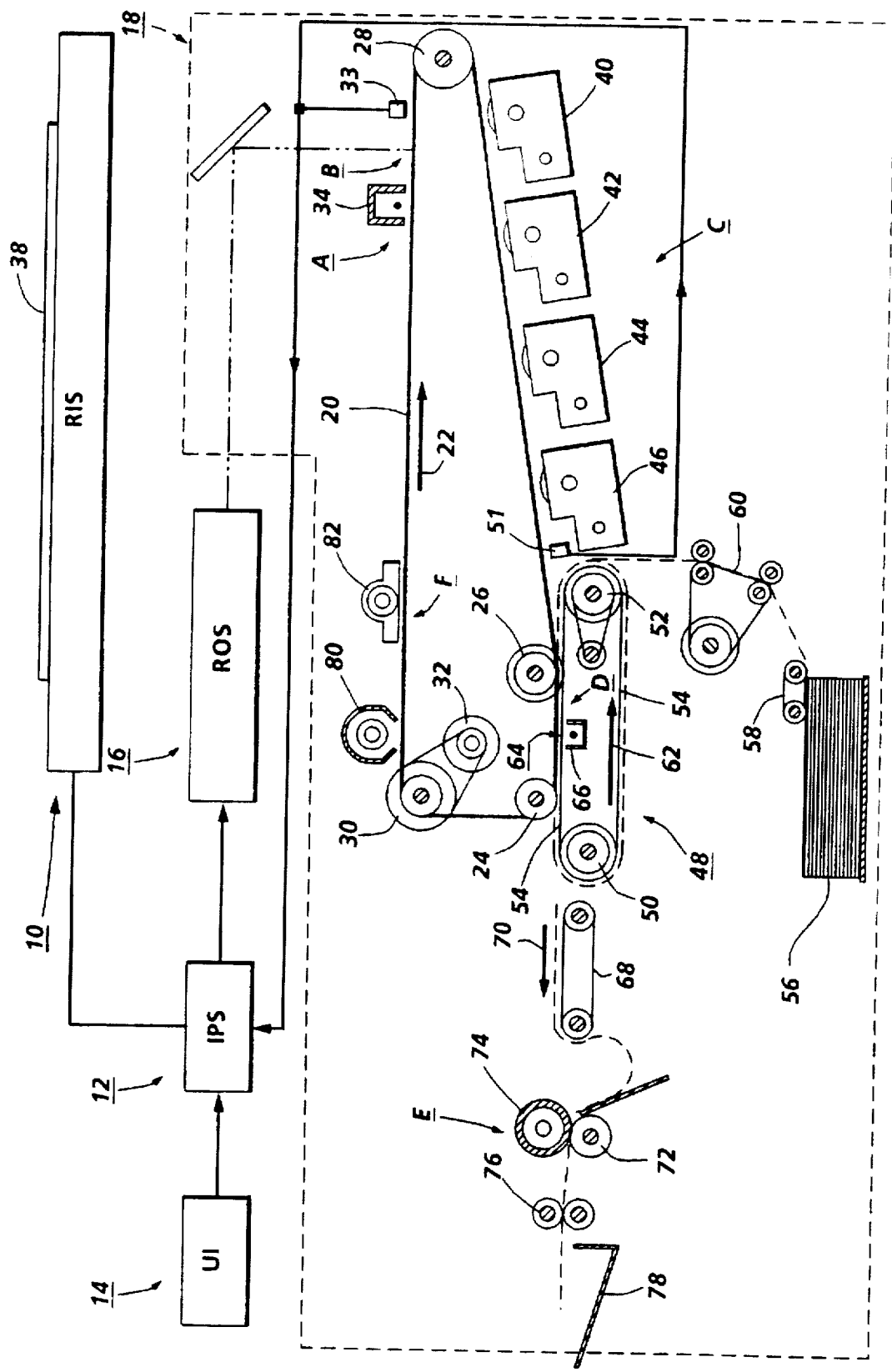

FIGS. 11 and 12 illustrate employing level 1, level 2, level 3 controllers to maintain the tone reproduction curve; and FIG. 13 is a schematic elevational view of an exemplary multicolor electrophotographic printing machine incorporating the features of the present invention therein.

While the present invention is described hereinafter with respect to a preferred embodiment, it will be understood that this detailed description is not intended to limit the scope of the invention to that embodiment. On the contrary, the description is intended to include all alternatives, modifications and equivalents as may be considered within the spirit and scope of the invention as defined by the appended claims.

For a general understanding of the features of the present invention, reference is made to the drawings wherein like references have been used throughout to designate identical elements. A schematic elevational view showing an exemplary electrophotographic printing machine incorporating the features of the present invention therein is shown in FIG. 13. It will become evident from the following discussion that the present invention is equally well-suited for use in a wide variety of printing systems including ionographic printing machines and discharge area development systems, as well as other more general non-printing systems providing multiple or variable outputs such that the invention is not necessarily limited in its application to the particular system shown herein.

Turning initially to FIG. 13, before describing the particular features of the present invention in detail, an exemplary electrophotographic copying apparatus will be described. The exemplary electrophotographic system may be a multicolor copier, as for example, the Xerox Corporation "5775" copier. To initiate the copying process, a multicolor original document 38 is positioned on a raster input scanner (RIS), indicated generally by reference numeral 10. RIS 10 contains document illumination lamps, optics, a mechanical scanning drive, and a charge coupled device (CCD array) for capturing the entire image from original document 38. The RIS 10 converts the image to a series of raster scan lines and measures a set of primary color densities, i.e. red, green and blue densities, at each point of the original document. This information is transmitted as an electrical signal to an image processing system (IPS), indicated generally by the reference numeral 12, which converts the set of red, green and blue density signals to a set of colorimetric coordinates. The IPS contains control electronics for preparing and managing the image data flow to a raster output scanner (ROS), indicated generally by the reference numeral 16.

A user interface (UI), indicated generally by the reference numeral 14, is provided for communicating with IPS 12. UI 14 enables an operator to control the various operator adjustable functions whereby the operator actuates the appropriate input keys of UI 14 to adjust the parameters of the copy. UI 14 may be a touch screen, or any other suitable device for providing an operator interface with the system. The output signal from UI 14 is transmitted to IPS 12 which then transmits signals corresponding to the desired image to ROS 16.

ROS 16 includes a laser with rotating polygon mirror blocks. The ROS 16 illuminates, via mirror 37, a charged portion of a photoconductive belt 20 of a printer or marking engine, indicated generally by the reference numeral 18. Preferably, a multi-facet polygon mirror is used to illuminate the photoreceptor belt 20 at a rate of about 400 pixels per inch. The ROS 16 exposes the photoconductive belt 20 to record a set of three subtractive primary latent images thereon corresponding to the signals transmitted from IPS 12. One latent image is to be developed with cyan developer material, another latent image is to be developed with magenta developer material, and the third latent image is to be developed with yellow developer material. These developed images are subsequently transferred to a copy sheet in superimposed registration with one another to form a multicolored image on the copy sheet which is then fused thereto to form a color copy. This process will be discussed in greater detail hereinbelow.

With continued reference to FIG. 13, marking engine 18 is an electrophotographic printing machine comprising photoconductive belt 20 which is entrained about transfer rollers 24 and 26, tensioning roller 28, and drive roller 30. Drive roller 30 is rotated by a motor or other suitable mechanism coupled to the drive roller 30 by suitable means such as a belt drive 32. As roller 30 rotates, it advances photoconductive belt 20 in the direction of arrow 22 to sequentially advance successive portions of the photoconductive belt 20 through the various processing stations disposed about the path of movement thereof.

Photoconductive belt 20 is preferably made from a polychromatic photoconductive material comprising an anticurl layer, a supporting substrate layer and an electrophotographic imaging single layer or multi-layers. The imaging layer may contain homogeneous or heterogeneous, inorganic or organic compositions. Preferably, finely divided particles of a photoconductive inorganic or organic compound are dispersed in an electrically insulating organic resin binder. Typical photoconductive particles include trigonal selenium, metal free phthalocyanine, copper phthalocyanine, vanadyl phthalocyanine, hydroxy gallium phthalochanine, titanol phthalocyanine, quinacridones, 2,4-diamino-triazines and polynuclear aromatic quinines. Typical organic resinous binders include polycarbonates, acrylate polymers, vinyl polymers, cellulose polymers, polyesters, polysiloxanes, polyamides, polyurethanes, epoxies, and the like as well as copolymers of the above polymers.

Initially, a portion of photoconductive belt 20 passes through a charging station, indicated generally by the reference letter A. At charging station A, a corona generating device 34 or other charging device generates a charge voltage to charge photoconductive belt 20 to a relatively high, substantially uniform voltage potential. The corona generator 34 comprises a corona generating electrode, a shield partially enclosing the electrode, and a grid disposed between the belt 20 and the unenclosed portion of the electrode. The electrode charges the photoconductive surface of the belt 20 via corona discharge. The voltage potential applied to the photoconductive surface of the belt 20 is varied by controlling the voltage potential of the wire grid.

Next, the charged photoconductive surface is rotated to an exposure station, indicated generally by the reference letter B. Exposure station B receives a modulated light beam corresponding to information derived by RIS 10 having a multicolored original document 38 positioned thereat. The modulated light beam impinges on the surface of photoconductive belt 20, selectively illuminating the charged surface of photoconductive belt 20 to form an electrostatic latent image thereon. The photoconductive belt 20 is exposed four times to record three latent images representing each color and the undercolor black.

After the electrostatic latent images have been recorded on photoconductive belt 20, the belt is advanced toward a development station, indicated generally by the reference letter C. However, before reaching the development station C, the photoconductive belt 20 passes subjacent to a voltage monitor for measurement of the voltage potential at the surface of the photoconductive belt 20. The electrostatic voltmeter 33 can be any suitable type known in the art wherein the charge on the photoconductive surface of the belt 20 is sensed, such as disclosed in U.S. Pat. Nos. 3,870,968; 4,205,257; or 4,853,639, the contents of which are incorporated by reference herein.

A typical electrostatic voltmeter is controlled by a switching arrangement which provides the measuring condition in which charge is induced on a probe electrode corresponding to the sensed voltage level of a control patch on the belt 20. The induced charge is proportional to the sum of the internal capacitance of the probe and its associated circuitry, relative to the probe-to-measured surface capacitance. A DC measurement circuit is combined with the electrostatic voltmeter circuit for providing an output which can be read by a conventional test meter or input to a control circuit. The voltage potential measurement of the photoconductive belt 20 is utilized to determine specific parameters for maintaining a predetermined potential on the photoreceptor surface. Imaging parameters, for example Vdev, Vclean, and discharge ratio, can be obtained by knowing the light exposure ranges, initially potential V and the potential after exposure. Then, the actuators of scorotron, machine exposure power and developer bias are adjusted to desire set up values. Efficient means are known, for example, U.S. Pat. No. 5,016,050, which is hereby incorporated by reference.

The development station C includes four individual developer units indicated by reference numerals 40, 42, 44 and 46. The developer units are of a type generally referred to in the art as "magnetic brush development units". Typically, a magnetic brush development system employs a magnetizable developer material including magnetic carrier granules having toner particles adhering triboelectrically thereto. The developer material is continually brought through a directional flux field to form a brush roll of developer material. The developer material is constantly moving so as to continually provide the brush with fresh developer material. Development is achieved by bringing the brush roll of developer material into contact with the photoconductive surface.

Developer units 40, 42, and 44, respectively, apply toner particles of a specific color corresponding to the compliment of the specific color separated electrostatic latent image recorded on the photoconductive surface. Each of the toner particle colors is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document.

In FIG. 13, developer unit 40 is shown in the operative position with developer units 42, 44 and 46 being in the non-operative position. During development of each electrostatic latent image, only one developer unit is in the operative position, while the remaining developer units are in the non-operative position. Each of the developer units is moved into and out of an operative position. In the operative position, the magnetic brush is positioned substantially adjacent the photoconductive belt, while in the non-operative position, the magnetic brush is spaced therefrom. Thus, each electrostatic latent image or panel is developed with toner particles of the appropriate color without commingling. After being developed, a test patch passes beneath densitometers, indicated generally by the reference numeral 51. Densitometers 51 is positioned adjacent the surface of belt 20. The test patch is illuminated with electromagnetic energy when the test patch is positioned beneath the densitometer. Densitometers 51, generates proportional electrical signals in response to electromagnetic energy, reflected off of the substrate and toner test patch, that was received by the densitometer. In response to the signals, the amount of developed toner mass per unit of area for each of the toner colors can be calculated. The present invention employs optimized color densitometers (OCD), which measures material density located on a substrate by detecting and analyzing both specular and diffuse electromagnetic energy signal reflected off of the density of material located on the substrate as described in U.S. Pat. No. 5,162,874 which is hereby incorporated by reference. Also, test patches can be sensed by densitometer 51a which measure the developed toner transfer to the sheet.

After development, the toner image is moved to a transfer station, indicated generally by the reference letter D.

Transfer station D includes a transfer zone, generally indicated by reference numeral 64, defining the position at which the toner image is transferred to a sheet of support material, which may be a sheet of plain paper or any other suitable support substrate. A sheet transport apparatus, indicated generally by the reference numeral 48, moves the sheet into contact with photoconductive belt 20. Sheet transport 48 has a belt 54 entrained about a pair of substantially cylindrical rollers 50 and 52. A friction retard feeder 58 advances the uppermost sheet from stack 56 onto a pre-transfer transport 60 for advancing a sheet to sheet transport 48 in synchronism with the movement thereof so that the leading edge of the sheet arrives at a preselected position, i.e. a loading zone. The sheet is received by the sheet transport 48 for movement therewith in a recirculating path. As belt 54 of transport 48 moves in the direction of arrow 62, the sheet is moved into contact with the photoconductive belt 20, in synchronism with the toner image developed thereon.

In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this manner, three different color toner images are transferred to the sheet in superimposed registration with one another. Each of the electrostatic latent images recorded on the photoconductive surface is developed with the appropriately colored toner and transferred, in superimposed registration with one another, to the sheet for forming the multi-color copy of the colored original document. One skilled in the art will appreciate that the sheet may move in a recirculating path for four cycles when undercolor black removal is used.

After the last transfer operation, the sheet transport system directs the sheet to a vacuum conveyor, indicated generally by the reference numeral 68. Vacuum conveyor 68 transports the sheet, in the direction of arrow 70, to a fusing station, indicated generally by the reference letter E, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to a catch tray 78 for subsequent removal therefrom by the machine operator.

The last processing station in the direction of movement of belt 20, as indicated by arrow 22, is a cleaning station, indicated generally by the reference letter F. A lamp 80 illuminates the surface of photoconductive belt 20 to remove any residual charge remaining thereon. Thereafter, a rotatably mounted fibrous brush 82 is positioned in the cleaning station and maintained in contact with photoconductive belt 20 to remove residual toner particles remaining from the transfer operation prior to the start of the next successive imaging cycle.

The foregoing description should be sufficient for purposes of the present application for patent to illustrate the general operation of an electrophotographic printing machine incorporating the features of the present invention. As described, an electrophotographic printing system may take the form of any of several well known devices or systems. Variations of specific electrophotographic processing subsystems or processes may be expected without affecting the operation of the present invention.

The concept of the present invention is to utilize a Tone Reproduction Curve Controller. The control system is composed of 3 parts or levels. At the lowest level, level 1, control of the latent image on the photoreceptor is achieved. The function of this level of control is to convert three latent image parameters, Vdev, Vclean and Discharge ratio (DR), into the machine actuators of scorotron, exposure level and developer bias. The three latent image parameters are used because they are related to specific attributes of a printed image, such as solid area density, background toner coverage and halftone density, and are independent of such complicating factors as photoreceptor dark decay, cycledown or light fatigue. It is the responsibility of the level 1 control to deal with these complications while guaranteeing Vdev, Vclean and discharge ratio (DR).

The Level 2 control sends the appropriate setpoints for Vdev, Vclean and DR to the Level-1 control. The value of these setpoints is determined by measurements of toner on the photoreceptor using the Optimized Color Densitometer or OCD. In Level 2, the measurement of a solid area patch will be translated into a setpoint for Vdev, a measurement for a 50% halftone will be translated into a setpoint for the discharge ratio (DR). Vclean may also be the result of active measurements, but in the present system it is given a suitable constant value that minimizes background without affecting highlight halftones too much.

Figure 4:
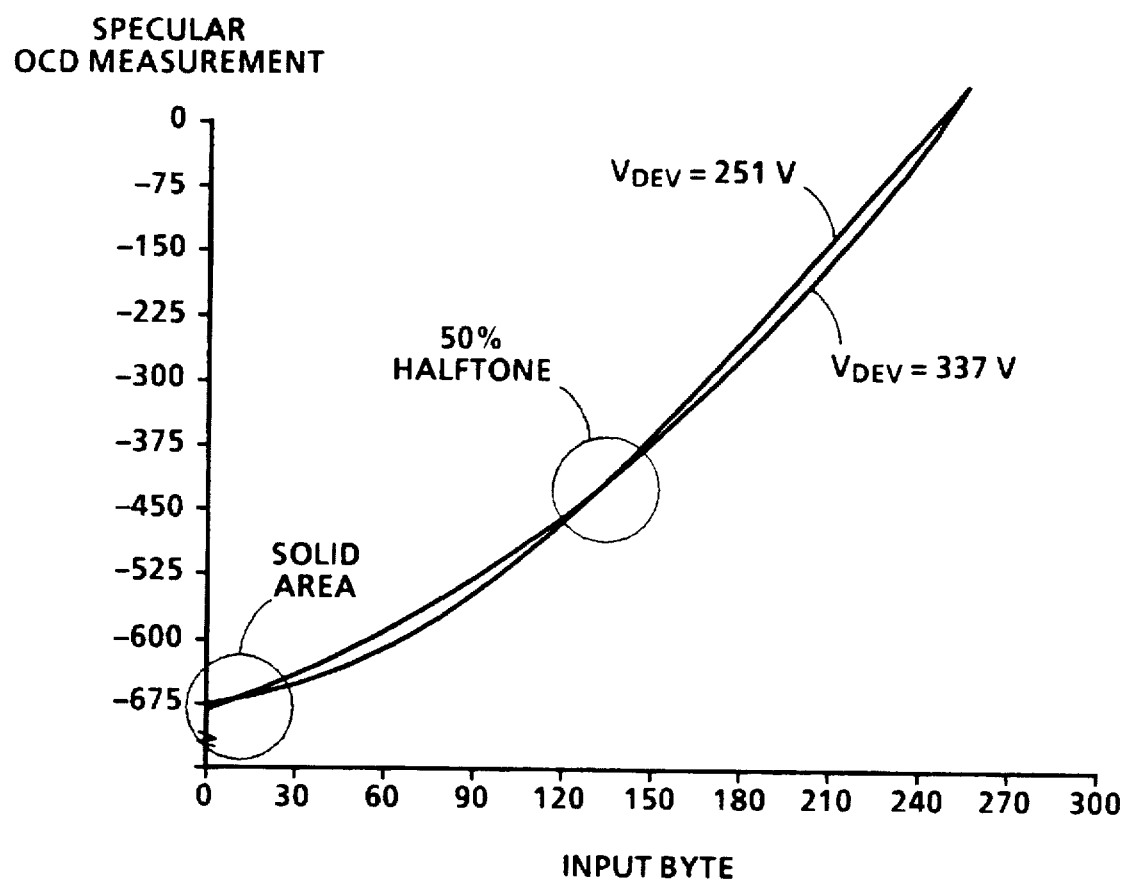
FIG. 4 illustrates employing level 1 and level 2 controllers to maintain the tone reproduction curve.

Also included in Level 1 and Level 2 is toner concentration control. Using a pixel count from the IPS, toner can be added to the developer units in proportion to that withdrawn, thus maintaining a constant toner concentration. With these various xerographic methods of control, a great deal of stability in tone reproduction can be achieved. Complete stability however, is not achieved, as is illustrated in FIG. 4. Here all available xerographic means have been employed to control the tone reproduction. Still, the highlight and shadow regions of the tone reproduction curve show uncontrolled variation. To control the tone reproduction in these areas, a Level-3 controller is used. A most significant and important feature of the present invention is the ability to correct tone reproduction in response to halftone patch measurements while printing is underway.

The Level 3 controller of the present invention includes a hardware halftoner. The hardware halftoner maintains four separate halftone data structures, one for each color. Basically, an area of memory is devoted to storing the halftone dot specification. This data is static during printing and is accessed by a 16 bit address that is composed of 8 bits from the input halftone level and 8 bits derived from the pixel and scanline counters. Image data from a continuous tone original passes from a large image storage area of memory into a lookup table where it is translated from one byte value to another. After this, the data is used as input to the hardware halftoner where the appropriate binary output signals for the printed result are generated.

As indicated, the source of the contents of the lookup tables is data coming from, for example, an RS-232 line that is connected to a process control system. This communication link is sufficient to provide a new lookup table at sufficiently frequent intervals.

Figure 2:
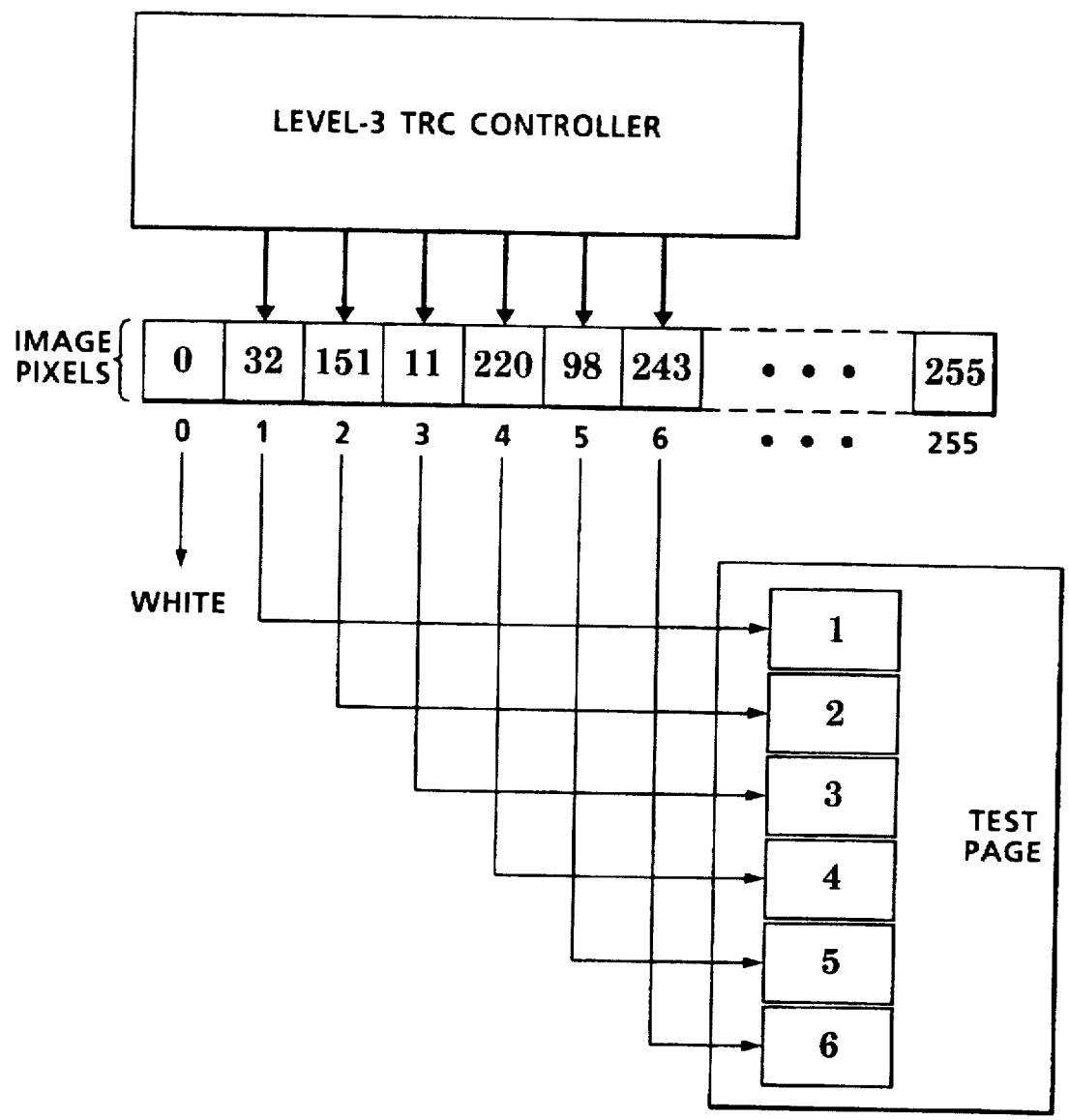
FIG. 2 illustrates an arbitrary selection of test patches generated by the present invention.

Although the hardware halftone system can accommodate up to 256 printed halftone levels, this is more than the 160 levels that is provided by the halftone dot growth pattern. Furthermore, 256 levels is more than a human observer can see, as discussed supra. So the printing of images can easily be accommodated in parallel with the printing of test patches for Level-3 control. FIG. 2 shows arbitrary selection of test patches which can be generated for the level 3 control. Although only 6 levels are shown, in the system, 30 locations in the hardware halftone lookup table are reserved for test patch generation. The tonal range of the image is then compressed and the available halftone dots expanded to fit into the remaining 226 levels.

Figure 1:
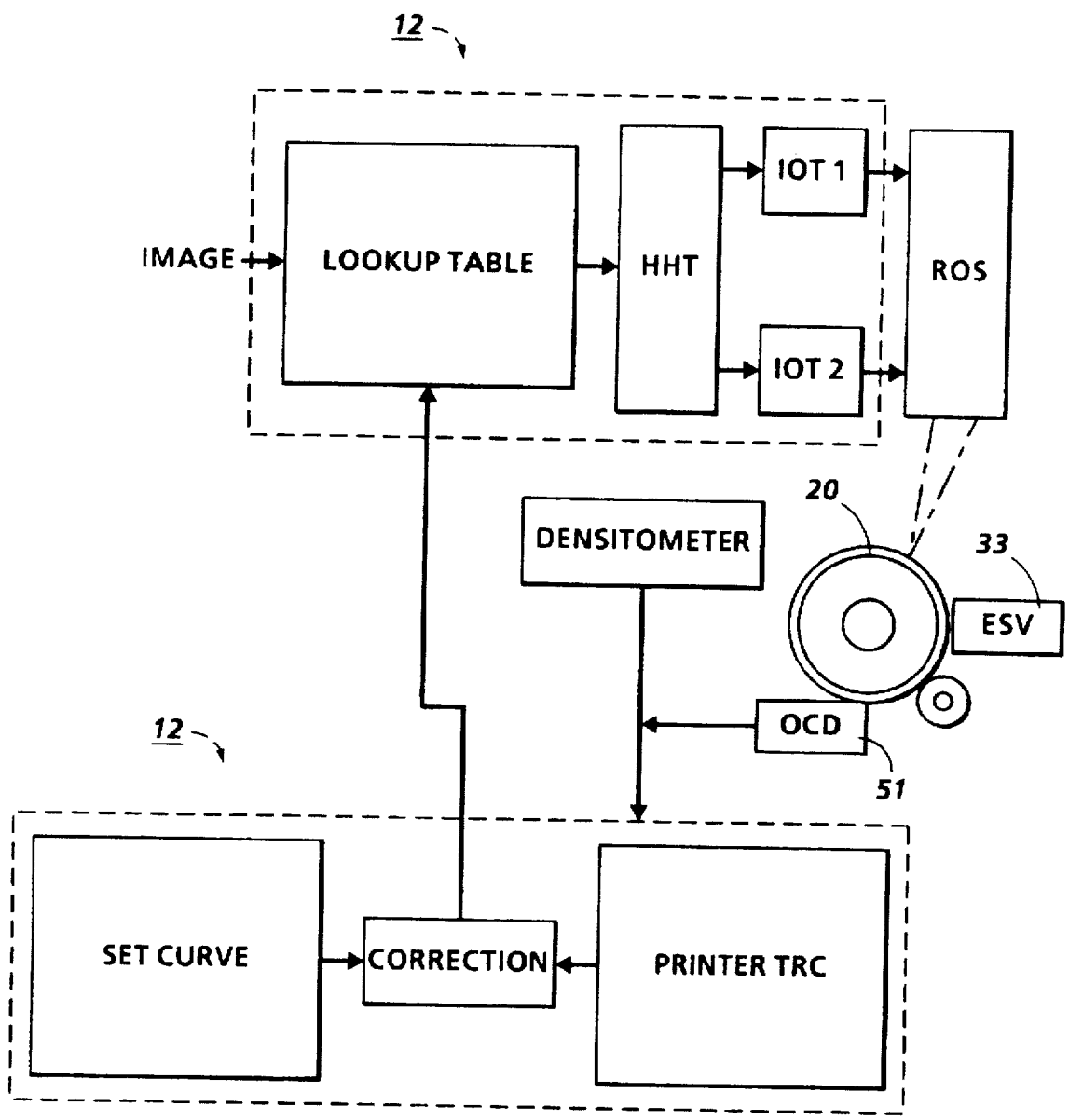
FIG. 1 illustrates a control schematic of the present invention.

As shown in FIG. 1, the primary sensor for measurement of the halftone patches is the OCD (Optimized Color Densitometer). This device uses both specular and diffuse reflected light to measure the amount of toner on the photoreceptor.

FIG. 1 also indicates the basic flow of information that occurs during a Level-3 controller correction. By some means, perhaps a factory or field calibration, a reference tone curve, or setcurve, is established in the control software. The Level-3 control detects the change of tone reproduction and computes a new lookup table that compensates for the measured deviation from the original setcurve.

In order for the Level-3 controller to work properly, it must be able to measure the printer tone reproduction. The method for generating test patches was just discussed, but the more difficult problem is to use the OCD signals effectively. The OCD works by emitting pulses of infrared light which strike the photoreceptor surface and reflect back in two ways. One way is by specular reflection from the bare photoreceptor. The surface of a photoreceptor is smooth enough that it acts largely as a mirror, reflecting the incident light at Snell's angle to the "specular" photodetector. This channel is useful because as toner covers more of the surface, such as when halftone dot patterns are present, the specular reflection will be attenuated. The word "specular" is in quotes above because there is another contribution to this photodetector from the other type of reflection, the diffuse reflection from the photoreceptor and especially from the toner. The diffuse reflection is isotropic so the light impinging on the "specular" photodetector is the sum of the specular and diffuse reflected light. Another photodetector is positioned to collect only diffuse light, so that it is possible to determine the pure specular reflection intensity.

Figure 3:
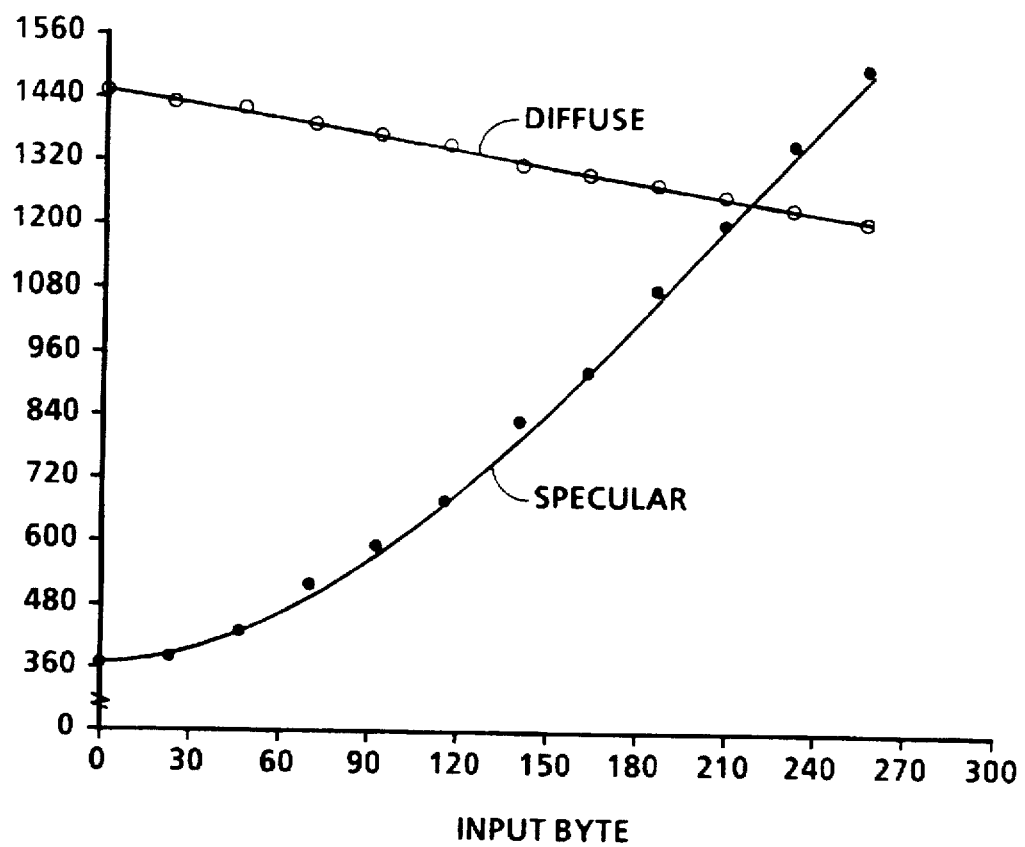
FIG. 3 shows the results of measuring twelve different halftone patches with both the specular and the diffuse photodetectors.

Principles of the present invention were tested in a printing machine as shown in FIG. 13. FIG. 3 shows the results of measuring twelve different halftone patches with both the specular and the diffuse photodetectors. The expected change as area coverage increases is observed; the diffuse light is increased and the specular detector signal decreases. The diffuse contribution to the specular signal should be determined and subtracted from the signal to compute the pure specular reflection. This is not necessary for two reasons. One is that the diffuse contribution is quite small and the signal is dominated by attenuation of specular light by halftone toner coverage. The other is that one seek only a reliable measure that is proportional to area coverage in some reproducible way. That is, the exact specular or diffuse measure is not important as long as the real tone reproduction curve can be represented by the measurements. The output of the "specular" detector provides the required representation. The present invention also assures that the specular channel is sensitive to the shadow region of the tone reproduction curve.

Figure 5:
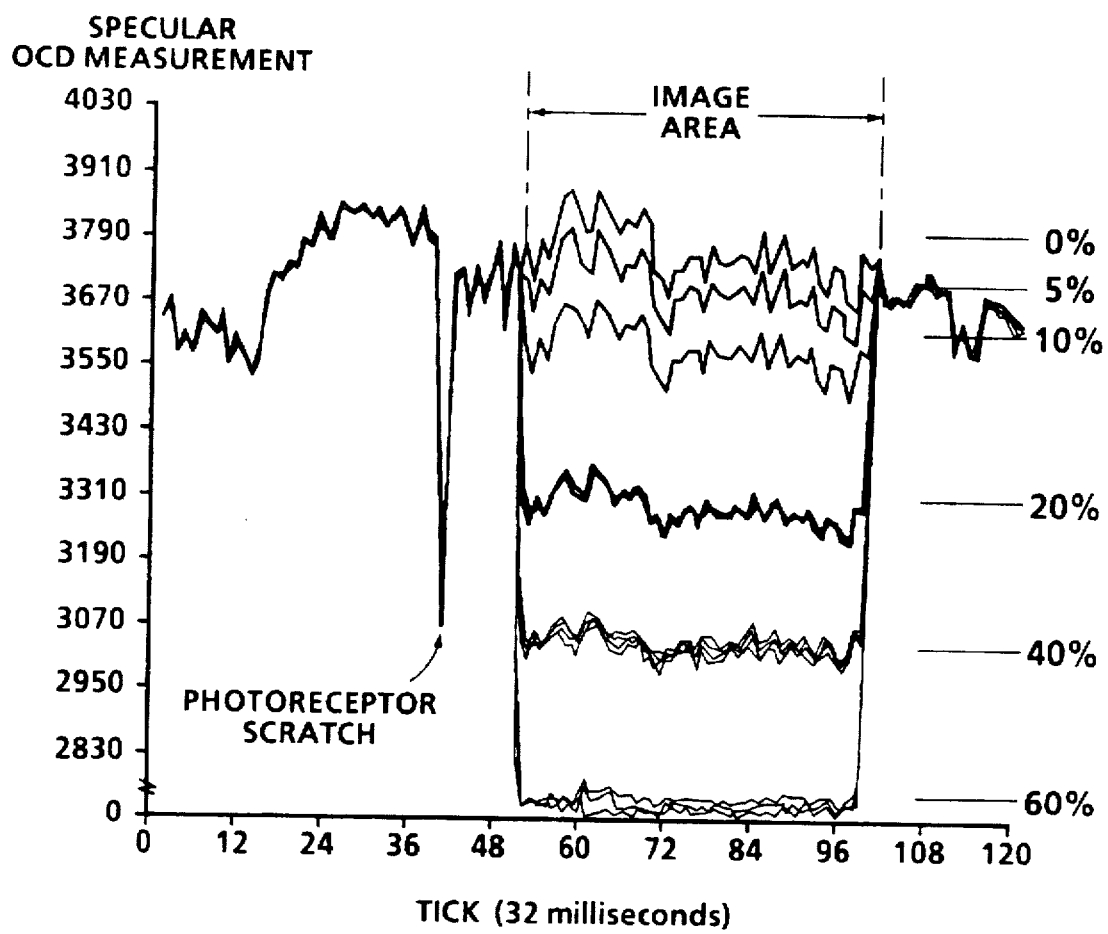
FIG. 5 illustrates drum signature effects.

Allowing the specular channel as the measurement of the tone curve, there is another more serious problem to solve. The surface of a photoreceptor shows quite a large variation in smoothness and hence there is a non-uniformity or a "signature" in the bare drum OCD readings. Referring to FIG. 5, one notes that because of the signature, a 5% halftone patch at one location on the photoreceptor appears to have less toner than the bare drum measured at another location. Clearly, to measure multiple patches on a single page one must account for the signature. Also shown is the fact that as area coverage increases, the signature is obscured, until at about 60% halftone coverage there is no contribution from the signature to the OCD specular measurement.

Figure 6:
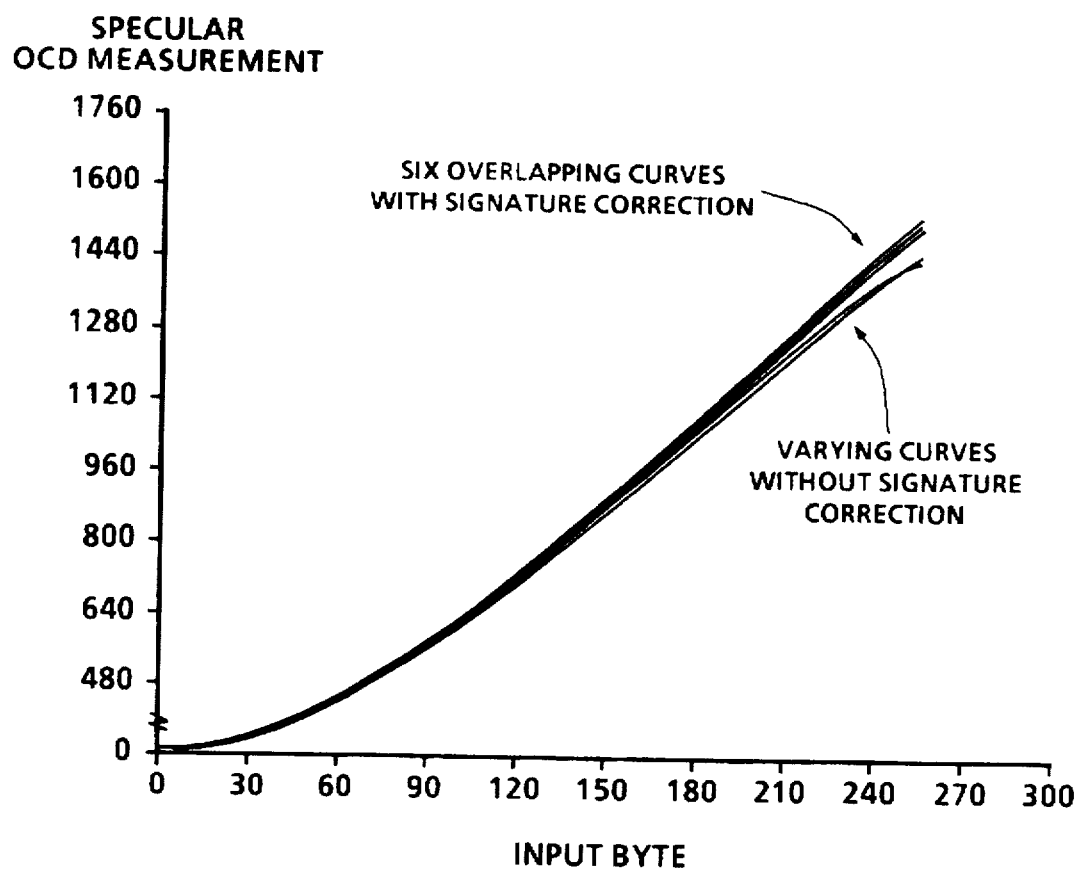
FIG. 6 illustrates the compensation for drum signature effects.

The measurement technique that solves these problems first chooses a point on the signature to act as a reference. Then at any patch location along the signature an offset to the reference can be computed. This, for example, will now equalize the measurements of the bare drum; a 0% patch will have the same reading no matter where on the page it appears. To measure halftones, the approximate area coverage that is known from the pixel value that made the halftone patch is used. With this pixel value, the signature offset can be discounted from the measurement in proportion to the area coverage, up to the 60% limit. The result of this procedure is shown in FIG. 6. Without signature correction the tone curve shows large variability while with correction, the tone curve is stable.

Figure 7:
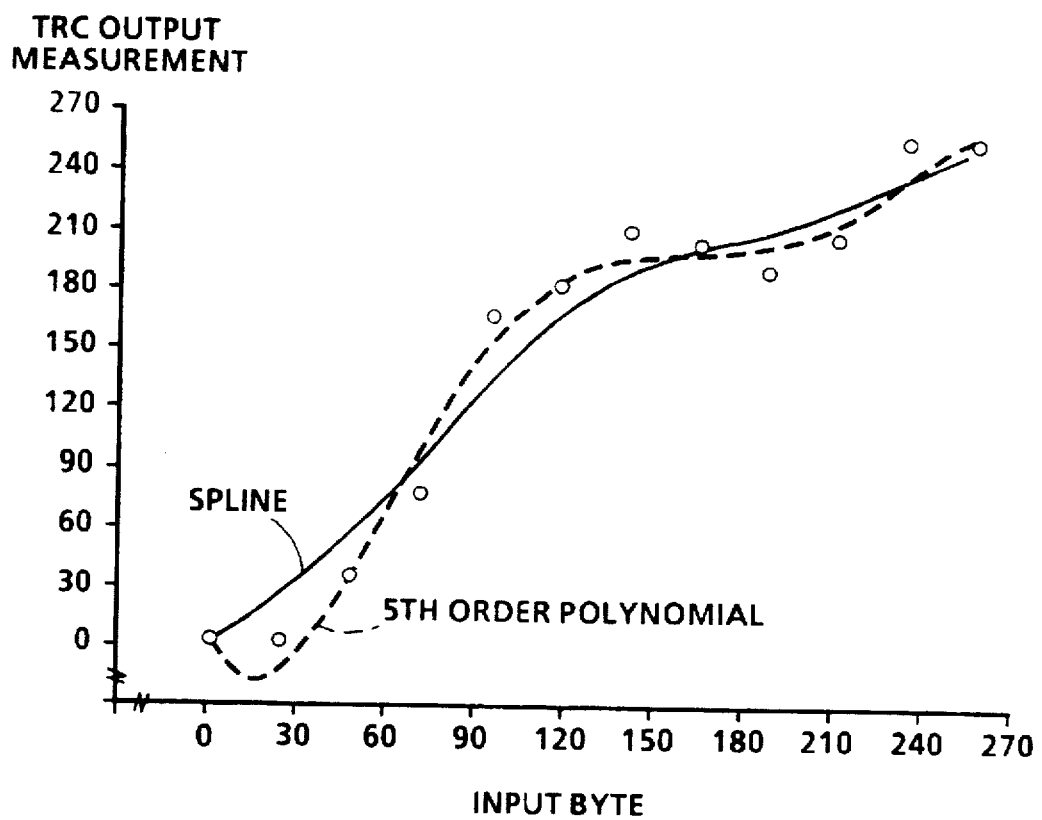
FIG. 7 illustrates a smoothing spline fit and corresponding 5th order polynomial fit.

Another issue regarding TRC sensing is fitting to the patch measurements. To completely measure the tone reproduction curve, each possible halftone that can be printed must be measured. In the case of the HQ breadboard, this is 160 different halftones. Measuring all the halftones is not practical. Preferably, there is an estimate of the output for every halftone. In addition there is noise in the measurements which must be smoothed away in the final best estimate of the TRC. FIG. 7 shows two methods of fitting, using a data set with exaggerated, though not impossible, noise. A simple 5th order polynomial fit is inappropriate because it is too global in its consideration of the data and produces excessive curvature and unstable endpoints. A better method is the smoothing spline. Here the data are considered on a more local basis and the goodness of fit can be balanced with the amount of curvature to produce a better interpolation of the data. In addition, the curve can be forced to pass through the solid area and 0% endpoints, a desirable attribute considering that these points will remain constant from the actions of the level 1 and 2 controllers.

FIG. 8 shows the correction algorithm. The input to the algorithm is the Set Curve, the present measured TRC (Printer TRC) and the present lookup table [Integer Look-Up Table]. As indicated in the code, for all 256 points in the setcurve a pair of measured printer TRC points are selected that contain, or bracket, the setcurve point. Associated with the pair of printer TRC points are the corresponding values from the lookup table. The value of the setcurve point within the printer TRC interval is used proportionally to compute the new lookup table value (new point). For each point in the Set Curve the procedure is repeated until the new lookup table is complete. This new lookup table should then redistribute the measured printer levels to correspond to the setcurve. From the point of view of some standard input image representation then, the tone reproduction appears constant.

Figure 9:
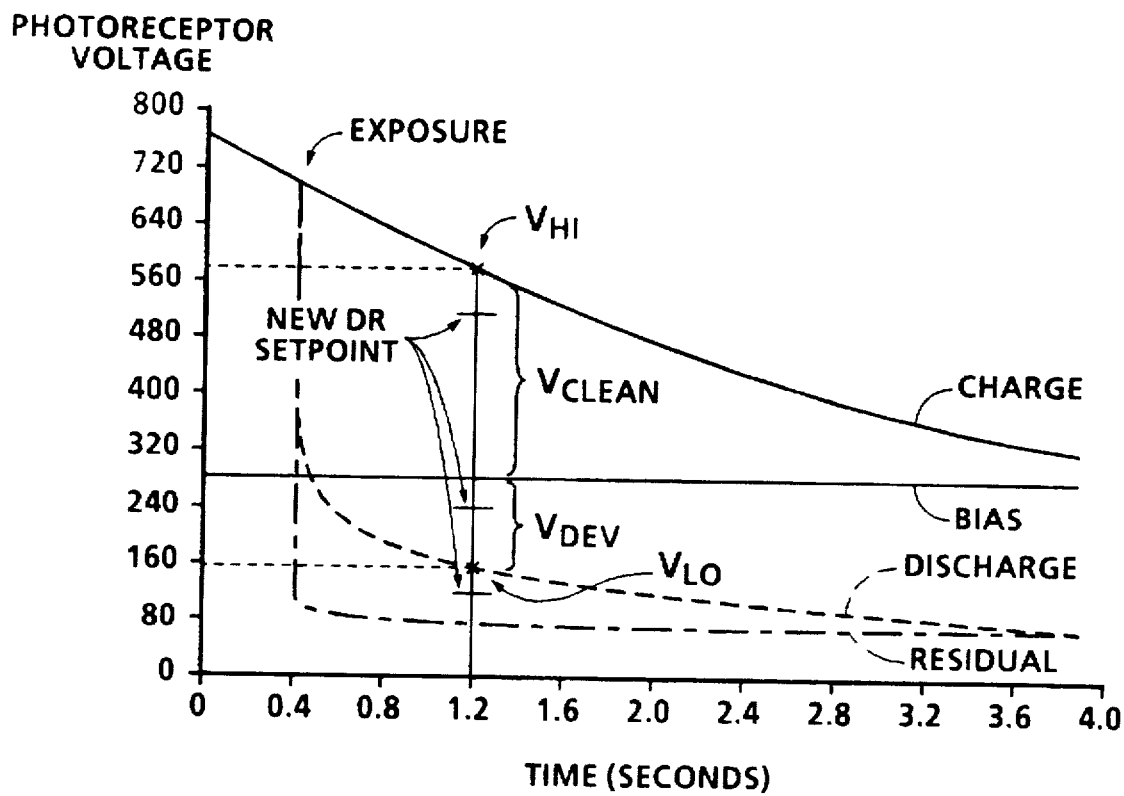
FIG. 9 illustrates a changes in the discharge ratio.

FIG. 9 illustrates a change in the discharge ratio. The usefulness of the discharge ratio is that it provides an independent way to specify the exposure level. If the ROS exposure power alone is changed, then many other important xerographic parameters like Vdev and Vclean will also change. The observed result on the print will be a complex mixture of exposure, Vdev and Vclean changes. Using the discharge ratio, the Vdev and Vclean are constrained to be constant. The contrast window essentially moves up or down with respect to the photoreceptor residual level. This sort of change in the discharge ratio does not alter the solid area density or the cleaning field, and so has a well defined independent influence on halftone density.

Figure 10:
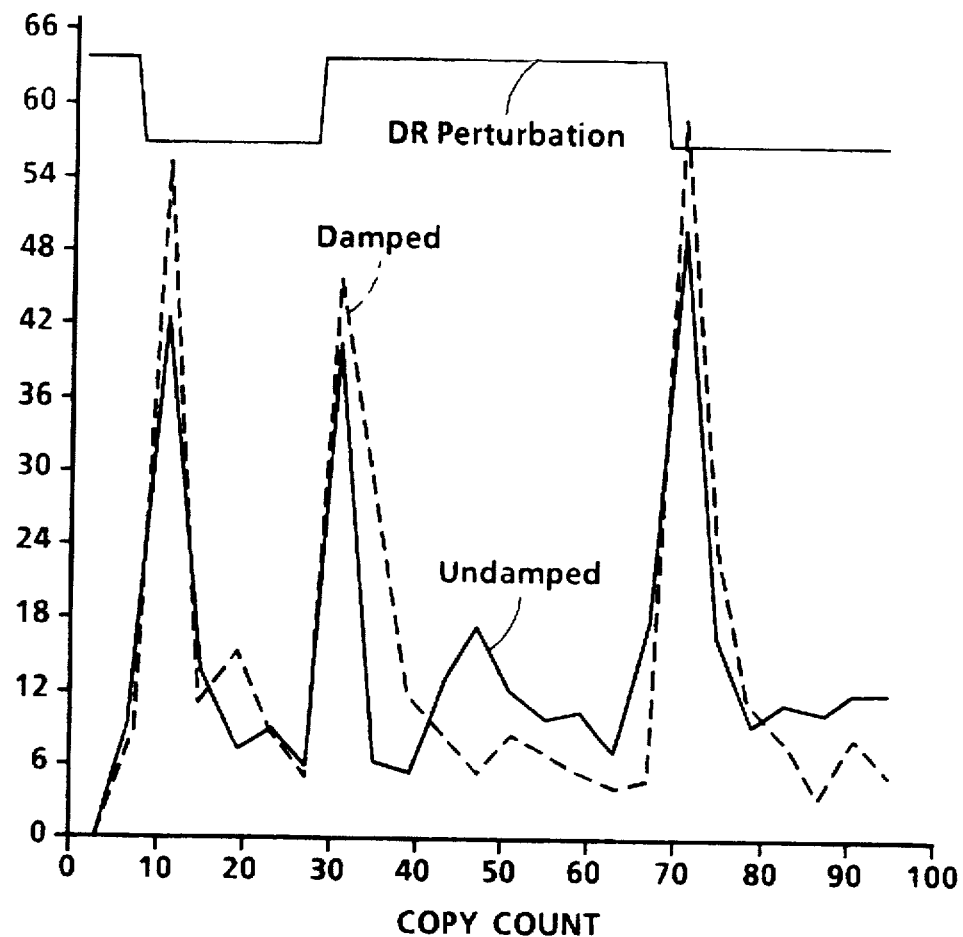
FIG. 10 illustrates TRC correction with the present invention in an undamped condition and in a damped condition.

The present invention provides some damping in the computation of the new lookup table. Basically, the new measured printer TRC is averaged in some proportion with the old printer TRC measurement. This damping technique imparts a greater immunity to measurement noise, while slowing the response of the controller. The results of the damped embodiment of the present invention are shown in FIG. 10.

The use of the damped embodiment of the present invention may appear to suffer from a slow response to a perturbation. In a real application however, this is not expected to be a handicap. As stated, the expected perturbations in a real environment will be slow acting changes occurring over the course of many prints. The priority in this case is to keep the noise level low, while sacrificing the largely irrelevant response time of the controller.

FIGS. 11 and 12 show the use of the complete three level control system. In FIG. 4 the inability of levels 1 and 2 to control the entire tone reproduction curve was shown. In FIG. 12, a similar experiment is performed but now the Level-3 controller insures that the shadow and highlight regions are also maintained against the development perturbation. This graph clearly demonstrates that the three level control system devised for the printing machine is capable in controlling not just solid area and one halftone level but indeed the entire tone reproduction curve, from highlights to shadow.

In recapitulation, there has been provided a three level system Level 1 converts three image relevant parameters (Vdev, Vclean and DR) into the direct electrostatic actuators that ultimately form the latent image. Level 2 uses the OCD sensor to detect the amount of toner on the photoreceptor and uses the image relevant parameters to alter the latent image and obtain controlled developed masses for solid area and a 50% halftone on the photoreceptor. The Level 3 controller insures that all the possible halftones are distributed as desired and that the colors of a final print will remain constant against outside influences or perturbations.

It is, therefore, apparent that there has been provided in accordance with the present invention, an apparatus and material for maintaining tone reproduction for printing halftoned images in a printer.system for an electrophotographic printing machine that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method of maintaining tone reproduction for printing of a final halftoned image in a printer, comprising the steps of:

marking representative halftone targets on an imageable surface with toner;

sensing an amount of toner on each of the representative halftone targets, said sensing step includes the step of adjusting the amount of toner sensed to compensate for deviation in said imageable surface;

generating a representative tone reproduction curve base on the amount of toner sensed on the representative halftone targets;

producing a feedback signal by comparing the representative tone reproduction curve to a setup calibration tone curve; and adjusting pixel data of each pixel of the final halftone image to compensate for deviation between representative tone reproduction curve and the setup calibration tone curve during printer operation to achieve the desire tonality of the final halftone image.

2. The method according to claim 1, wherein said sensing step comprises:

illuminating the imageable surface with infrared light; and using an optimized color densitometer to measure an intensity of specular and diffuse light reflected off of the imageable surface and the representative halftone targets.

3. The method according to claim 2, further comprising:

detecting non-uniformity in smoothness on the imageable surface; and determining a signature of the imageable surface from the non-uniformities detected on the imageable surface.

4. The method according to claim 3, wherein said adjusting step comprises compensating for the signature of the imageable surface.

5. The method according to claim 1, wherein said adjusting step comprises generating a look-up table based upon deviation between representative tone reproduction curve and the setup calibration tone curve.

6. The method according to claim 1, wherein said generating step comprises using a smoothing spline fit to determine the end points of the representative tone reproduction curve.

7. The method according to claim 1, wherein the continuous tone image is generated by using a tone reproduction curve.

8. The method according to claim 1, wherein the printer is a color printer.

9. The method according to claim 8, wherein the feedback signal contains information to adjust for a plurality of colors.

10. The method according to claim 8, wherein the imageable surface is a copy sheet.

11. An apparatus for maintaining tone reproduction for printing of a final halftoned image in a printer, comprising:

means for generating a continuous tone image;

halftoner means for generating pixel data based on the continuous tone image, each pixel data having pixel position parameters and desired pixel darkness parameters;

means for marking representative halftone targets on an imageable surface with toner;

a sensor for sensing an amount of toner on each of the representative halftone targets, said sensor including means for adjusting the amount of toner sensed to compensate for deviation in said imageable surface;

means for generating a representative tone reproduction curve base on the amount of toner sensed on the representative halftone targets; and means for producing a feedback signal by comparing the representative tone reproduction curve to a setup calibration tone curve, said halftoner responsive to said producing means, and adjusting pixel data of each pixel of the final halftone image to compensate for deviation between representative tone reproduction curve and the setup calibration tone curve during printer operation to achieve the desired tonality of the final halftone image.

12. The apparatus according to claim 11, wherein said sensor comprises:

an infrared light source illuminating the imageable surface; and an optimized color densitometer for measuring an intensity of specular and diffuse light reflected off of the imageable surface and the representative halftone targets and producing signals representative of toner amounts thereon.

13. The apparatus according to claim 12, further comprising:
   means for detecting non-uniformities of smoothness on the imageable surface; and
   means determining a signature of the imageable surface from the non-uniformities detected on the imageable surface.

14. The apparatus according to claim 13, wherein said halftoner means comprises means for compensating for the signature of the imageable surface.

15. The apparatus according to claim 11, wherein said halftoner means includes means for generating a look-up table based upon deviation between representative tone reproduction curve and the setup calibration tone curve.

16. The apparatus according to claim 11, wherein the continuous tone image is generated by using a tone reproduction curve.

17. The apparatus according to claim 11, wherein the printer is a color printer.

18. The apparatus according to claim 17, wherein the feedback signal contains information to adjust for a plurality of colors.

* * * * *